United States Patent
Nose

[19]

[11] Patent Number: 5,552,653
[45] Date of Patent: Sep. 3, 1996

[54] ELECTRIC MOTOR WITH INCREASED T/N CHARACTERISTIC VALUE

[75] Inventor: Tamotsu Nose, Nagano, Japan

[73] Assignee: Kabushiki Kaisha Sankyo Seiki Seisakusho, Nagano, Japan

[21] Appl. No.: 171,625

[22] Filed: Dec. 22, 1993

[30] Foreign Application Priority Data

| Dec. 22, 1992 | [JP] | Japan | 4-356824 |
| Dec. 29, 1992 | [JP] | Japan | 4-361078 |
| Dec. 29, 1992 | [JP] | Japan | 4-361079 |
| Dec. 29, 1992 | [JP] | Japan | 4-361080 |
| Dec. 29, 1992 | [JP] | Japan | 4-361081 |
| Jan. 28, 1993 | [JP] | Japan | 5-032650 |
| Jan. 28, 1993 | [JP] | Japan | 5-032651 |
| Jan. 28, 1993 | [JP] | Japan | 5-032652 |
| Jan. 28, 1993 | [JP] | Japan | 5-032653 |
| Sep. 27, 1993 | [JP] | Japan | 5-262962 |
| Sep. 27, 1993 | [JP] | Japan | 5-262963 |
| Sep. 30, 1993 | [JP] | Japan | 5-268039 |

[51] Int. Cl.$^6$ ............................... H02K 1/22
[52] U.S. Cl. .................. 310/263; 310/12; 310/67 R; 310/156
[58] Field of Search ................ 310/67 R, 263, 310/181, 156, 49 R, 40 MM, 12

[56] References Cited

U.S. PATENT DOCUMENTS

| 2,802,959 | 8/1957 | Powers | 310/263 |
| 3,571,637 | 3/1971 | Henningsen | 310/263 |
| 3,940,645 | 2/1976 | Takita | 310/263 |
| 4,733,120 | 3/1988 | Kawabe | 310/49 R |
| 4,814,651 | 3/1989 | Elris | 310/67 R |
| 4,868,433 | 9/1989 | Fujisaki | 310/40 MM |
| 4,959,577 | 9/1990 | Radomski | 310/268 |
| 4,980,595 | 12/1990 | Arora | 310/263 |
| 5,061,868 | 10/1991 | Iwazaki | 310/67 R |
| 5,225,725 | 7/1993 | Shiraki | 310/12 |
| 5,289,064 | 2/1994 | Sakamoto | 310/49 R |

*Primary Examiner*—R. Skudy
*Attorney, Agent, or Firm*—Sughrue, Mion, Zinn, Macpeak & Seas

[57] ABSTRACT

In an electric motor, in order to simplify the structure and to remarkably improve the T/N characteristic value, yoke plates mounted on a field magnet are so shaped that the total magnetic flux of the field magnet is collectively extended to the iron core of the armature with its direction repeatedly reversed. That is, in the motor, the multi-polarization is substantially obtained by designing it in such a manner that the total magnetic flux of the field magnet is not dispersed but concentrated. Hence, in the motor, unlike a conventional motor, the field magnet is not subjected to multi-polar magnetization, and the armature side is simplified in structure, and the magnetic flux from the field magnet is maximally utilized at all times, so that the number of magnetic poles and the effective flux $\Phi$ are both increased.

19 Claims, 13 Drawing Sheets

MAGNETIC FLUX REVERSE ANGLE

① ---- CONVENTIONAL BIPOLAR MOTOR (P=2)
② ——— CONVENTIONAL MULTI-POLAR MOTOR (P=10)
③ ——— MOTOR OF THE PRESENT INVENTION (P=10)

ELECTRIC MOTOR WITH INCREASED T/N CHARACTERISTIC VALUE

BACKGROUND OF THE INVENTION

1. Field of the Invention

This invention relates to an electric motor comprising an armature and a field magnet which are movable relative to each other.

2. Related Art

Recently, a variety of electric motors have been developed. One example of conventional electric motors is a three-phase motor as shown in FIGS. 27 and 28. The motor is of a so-called "2-3 (two magnetic poles—three core poles) structure". That is, a hollow-cylinder-shaped field magnet 2 is fixedly mounted on the inner surface of a casing 1, and an armature 3 is rotatably supported, for instance, inside the field magnet 2. The field magnet 2 is so magnetized that two different magnetic poles N and S are formed along the circumference. The armature 3 includes three protruded poles 3a, 3a and 3a which are set near the inner surface of the field magnet 2, to collect the magnetic flux. Coils 3b, 3b and 3b are wound on those three protruded poles 3a, 3a and 3a, respectively.

Another example of the conventional electric motors is a multipolar electric motor, which is as shown in FIG. 29. In the motor, a hollow-cylinder-shaped field magnet 12 fixedly fitted on the inner surface of a casing 11 is so magnetized that a number of different magnetic poles N and S are formed along the circumference at predetermined intervals, and an armature 13 is rotatably supported, for instance, inside the field magnet 12. The armature 13 includes a number of protruded poles 13a, 13a, . . . , on which coils 13b, . . . are wound respectively.

Those conventional electric motors suffer from a difficulty in that they are insufficient in the so-called "T/N characteristic value". The T/N characteristic value is the quotient obtained by dividing the torque T by the number of revolutions N in the motor's T-N characteristic. More specifically, $$\text{T/N characteristic value} = T_S/N_0 \quad (1)$$
$$= \Delta T/\Delta N$$
$$= K_E K_T/R$$

where $T_S$: Start torque $N_O$: No-load revolution number $K_E$: Counter electromotive force constant $K_T$: Torque constant R: Internal resistance The T/N characteristic value represents the magnitude of the T-N characteristic which is one of the basis characteristics of the motor. Hence, it can be utilized for comparison of the power of a motor. For instance, an electric motor of T/N=3 is able to provide the same T-N characteristic as three electric motors of T/N=2 which are operated at the same time. More specifically, the T/N characteristic value is proportional to about the square (more precisely the 5/3-rd power) of the volume of the motor, and substantially proportional to $BH_{MAX}$ of the field magnet. Hence, to use a larger motor or a stronger magnet is to increase the T/N characteristic value.

When the T/N characteristic value is increased, then the following can be achieved:

1) Increasing the generated torque
2) Decreasing the rising time
3) Increasing the torque constant and the counter electromotive force constant
4) Decreasing the rated current
5) Decreasing the loss (copper loss)
6) Improving the efficiency
7) Decreasing the generated heat
8) Increasing the output
9) Decreasing the effect of the variation in load on the variation in the number of revolutions In addition, depending on the T/N characteristic value, the following are permitted:

1) Reducing the size, thickness and weight of the motor
2) Reducing the manufacturing cost, for instance, by looking over the material cost
3) Increasing the degree of freedom in designing the motor.

As is apparent from the above description, most of the variety of propositions made for electric motors are to increase the T/N characteristic value. That is, as for an electric motor, the demands for reducing the size, decreasing the power consumption, saving the material, and reducing the manufacturing cost are based on (T/N characteristic value)/(size), and (T/N characteristic value)/(cost). Thus, heretofore, how to efficiently obtain the T/N characteristic value is a problem to be solved. In this connection, what are important are for instance as follows:

1) Decreasing the size, reducing the thickness, and decreasing the weight
2) Increasing the starting torque
3) Decreasing the rising time
4) Decreasing the current value
5) Reducing loss (copper loss)
6) Rationalizing Thus, most of the propositions made for the technique of electric motor are studies on the improvement of the T/N characteristic value. In practice, in the studies, the differences in T/N characteristic value are in a range of from 5% to 10%.

The T/N characteristic value is determined by factors P (the number of magnetic poles), Φ (effective magnetic flux), H (the number of parallel coils), A (coil sectional area), and L (coil length per T); that is, $$\text{T/N characteristic value} \propto P^2 \, \Phi^2 \, H \, A/L \quad (2)$$

Hence, by suitably selecting those factors, the T/N characteristic value can be maximized. In this case, it is a key point how to increase $P^2 \times \Phi^2$.

In view of the foregoing, the electric motor of the so-called "2-3 structure" described with reference to FIGS. 27 and 28 may be considered as follows: In the three-phase motor, the number of magnetic poles and the number of protruded poles are minimum, and, when the armature is positioned as shown in FIG. 27, the total magnetic flux of the N pole concentrates at one protruded pole 3a as indicated by the arrows. Therefore, the effective magnetic flux Φ is large; however, the improvement of the T/N characteristic value is limited because the number of magnetic poles (P) is two (2).

On the other hand, in the multipolar electric motor shown in FIG. 29, the number of magnetic poles (P) and the number of parallel coils (H) are larger, and the coil length (L) is shorter, so that the T/N characteristic value is improved as much. However, the confronting area of each protruded pole 13a of the armature 13 through which the former 13a confronts with the field magnet 12 is smaller, and the magnetic flux is dispersed; that is, one and the same magnetic flux is split for all the poles. Hence, although the number of magnetic poles (P) is larger, the effective magnetic flux ($\Phi$) is smaller. Thus, the value of $P_2 \times \Phi^2$ is not changed. On the other hand, the number of parallel coils (H) can be increased; however, this increase is canceled by the decrease in the coil sectional area (A). Hence, although the motor is intricate in structure, the T/N characteristic value cannot be increased so much. Accordingly, in the case of the multi-polar electric motor, a magnet high in $BH_{MAX}$ is employed to increase the effective magnetic flux ($\Phi$) thereby to improve the T/N characteristic value.

As is apparent from the above description, the conventional electric motor suffers from a difficulty in that the T/N characteristic value cannot be increased without employment of the strong magnet, which results in an increase in the manufacturing cost.

SUMMARY OF THE INVENTION

Accordingly, an object of this invention is to provide an electric motor which is simple in structure and is greatly improved in T/N characteristic value.

The foregoing object and other objects of the invention have been achieved by the provision of an electric motor comprising an armature including an iron core on which plural-phase coils are wound, and a field magnet which is so arranged as to be movable with respect to the armature; in which, according to the invention, the field magnet is extended in a direction in which the field magnet is movable with respect to the armature, and magnetized in a direction perpendicular to the direction in which the field magnet is extended, two yoke plates are mounted on the end faces of the field magnet thus magnetized, respectively, in such a manner that the two yoke plates are extended in the direction in which the field magnet is extended, each of the yoke plates includes a plurality of magnetic path forming protrusions which are arranged at predetermined intervals in the direction in which the yoke plate is extended, and the iron core and the magnetic path forming protrusions are so arranged that the iron core and the magnetic path forming protrusions are moved towards and away from each other so that the magnetic flux of the field magnet is collectively extended to the iron core, and the direction of the magnetic flux passing through the iron core is reversed every interval of the magnetic path forming protrusions as the armature and the field magnet are moved relative to each other.

The electric motor is made multi-polar substantially by designing the yoke plates mounted on the field magnet as follows: That is, the yoke plates are so shaped that the total magnetic flux of the field magnet is not dispersed but concentrated, which makes it unnecessary to subject the field magnet to multi-polar magnetization. In addition, the armature side is simplified in structure, and the number of magnetic poles and the effective flux are both increased.

If summarized, the yoke plates mounted on the field magnet are so shaped that the total magnetic flux of the field magnet is collectively extended to the iron core of the armature with its direction repeatedly inverted, thereby to multi-polarize the motor. That is, in the motor, the multi-polarization is substantially obtained by designing it in such a manner that the total magnetic flux of the field magnet is not dispersed but concentrated. Hence, in the motor, unlike a conventional motor, the field magnet is not subjected to multi-polar magnetization, and the armature side is simplified in structure, and the magnetic flux from the field magnet is maximumly utilized at all times, so that the number of magnetic poles and the effective flux are both increased. Thus, the motor of the invention is simple in structure, and has a high T/N characteristic value.

DETAILED DESCRIPTION OF THE PREFERRED EMBODIMENTS

Preferred embodiments of this invention will be described with reference to the accompanying drawings.

First Embodiment

Figure 1:
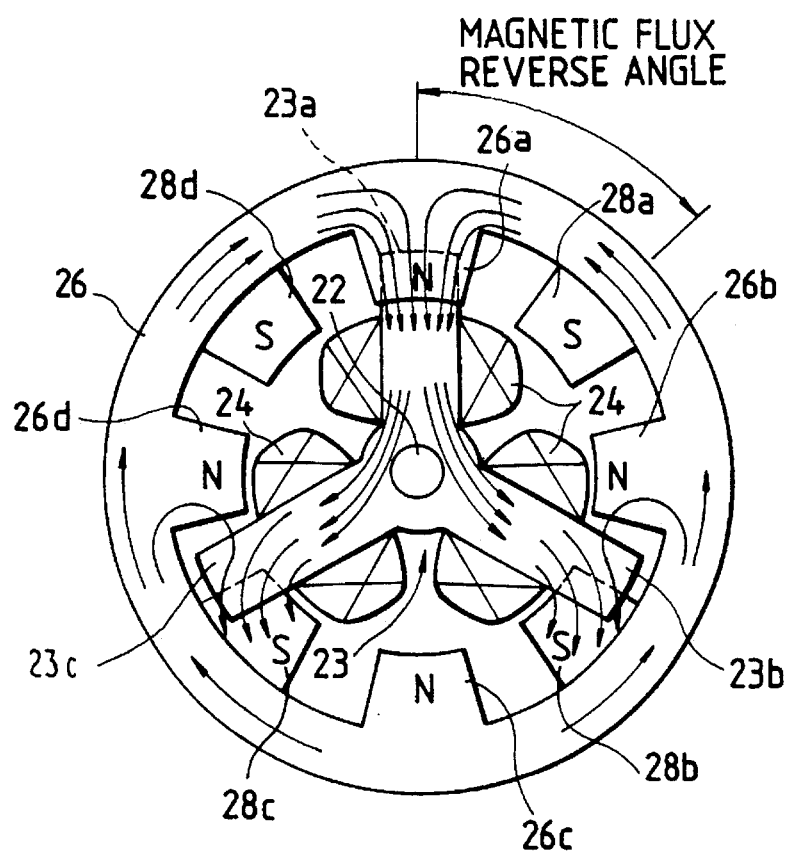
FIG. 1 is an explanatory plan view showing an electric motor which constitutes a first embodiment of this invention.
Figure 2:
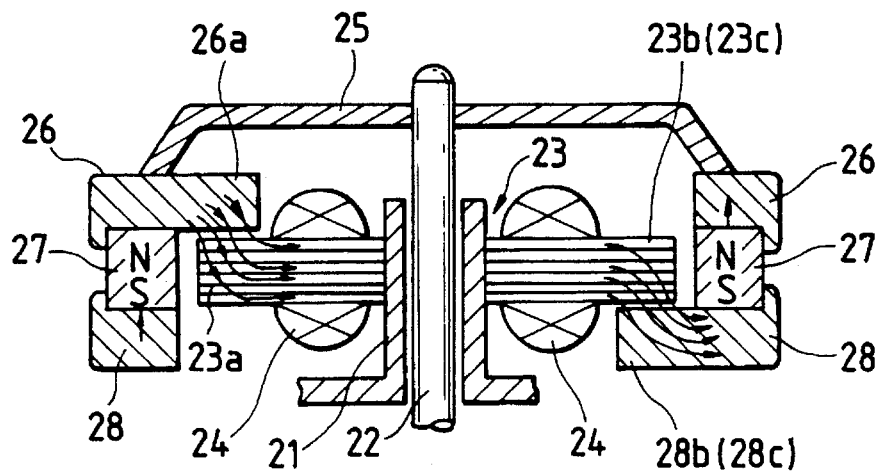
FIG. 2 is an explanatory sectional view showing the structure of the electric motor illustrated in FIG. 1.

FIGS. 1 and 2 shows a three-phase electric motor, which constitutes a first embodiment of the invention.

The motor is designed as follows: A rotary shaft 22 is rotatably supported in a hollow-cylinder-shaped bearing 21, which is set at the center of a casing (not shown). An iron core 23 forming the armature of the motor is fixedly mounted on the bearing 21, and three-phase coils 24 are wound on the iron core 23. The iron core 23 is formed by stacking a plurality of silicon steel strips to a predetermined thickness, and includes three protruded poles 23a, 23b and 23c which are arranged about the rotary shaft at angular intervals of 120°. The aforementioned coils 24 are for excitation, and wound on the middle portions of those protruded poles 23a, 23b and 23c, respectively.

A rotary disk 25 is fixedly mounted on the outer end portion of the rotary shaft 22, so that it is rotated together with the rotary shaft 22. A field magnet 27 is fixedly secured to the outer periphery of the rotary disk 25 through a yoke plate 26. The field magnet 27 is a hollow cylinder which surrounds the outer ends of the protruded poles 23a, 23b and 23c of the armature with a predetermined gap therebetween. The field magnet 27 is a magnet of ferrite or rare earth material, which is magnetized axially. In the embodiment, the field magnet 27 is so magnetized that, as shown in FIG. 2, its upper end face is an N pole, and its lower end face is an S pole.

The aforementioned yoke plate 26 is secured to the magnetized upper end face of the field magnet 27. Another yoke plate 28 is secured to the magnetized lower end face of the field magnet 27. The yoke plates 26 and 28 are annular members of ferromagnetic material which are laid on the magnetized end faces of the field magnet 27. Hence, the yoke plate 26 mounted on the upper end face (the N pole) of the magnet 27 is magnetized to N pole, while the yoke plate 28 mounted on the lower end face (the S pole) of the magnet 27 is magnetized to S pole.

Four magnetic path forming protrusions 26a, 26b, 26c and 26d are extended from the inner periphery of the yoke plate 26 towards the central axis, and similarly four magnetic path forming protrusions 28a, 28b, 28c and 28d are extended from the inner periphery of the yoke plate 28 toward the central axis. The magnetic path forming protrusions 26a, 26b, 26c and 26d of the yoke plate 26, and the magnetic path forming protrusions 28a, 28b, 28c and 28d of the yoke plate 28 are so designed that they turn while embracing the armature's iron core 23 therebetween.

That is, the magnetic path forming protrusions 26a, . . . and 28a . . . of the two yoke plates 26 and 28, and the armature's iron core 23 are moved towards or away from each other as they move relative to each other. More specifically, when they approach each other so that they confront with each other in the axial direction, the magnetic flux of the field magnet 27 extends through the magnetic path forming protrusions 26a, . . . and 28a . . . of the two yoke plates 26 and 28 to the iron core 23. The thickness of the magnetic path forming protrusions 26a, . . . and 28a . . . of the two yoke plates 26 and 28, and the confronting length of them over the iron core 23, are substantially equal to the thickness of the iron core 23.

The magnetic path forming protrusions 26a, 26b, 26c and 26d of the yoke plate 26 are arranged around the central axis at angular intervals of 90°, and similarly the magnetic path forming protrusions 28a, 28b, 28c and 28d of the yoke plate 28 are arranged around the central axis at angular intervals of 90°. And the magnetic path forming protrusions 26a, 26b, 26c and 26d of the yoke plate 26, and the magnetic path forming protrusions 28a, 28b, 28c and 28d of the yoke plate 28 are shifted 45° around the central axis from each other. That is, in the top view of the yokes 26 and 28, the magnetic path forming protrusions 26a, 26b, 26c and 26d magnetized to N pole, and the magnetic path forming protrusions 28a, 28b, 28c and 28d magnetized to S pole are alternately arranged around the central axis at angular intervals of 45°, in the order of the protrusion 26a of the yoke plate 26, the protrusion 28a of the yoke plate 28, the protrusion 26b of the yoke plate 26, the protrusion 28b of the yoke plate 28, and so forth. Hence, the direction of magnetic flux passing through the part of the iron core 28 on which the coil 24 is wound is reversed every angular interval (45°) of the magnetic path forming protrusions (for example 26a and 28a) of the two yoke plates.

When, in the motor thus constructed, the armature side and the magnetic field side are positioned as shown in FIGS. 1 and 2; that is, when the magnetic path forming protrusion 26a of the yoke plate 26 is located near the protruded pole 23a, and the magnetic path forming protrusions 28b and 28c of the other yoke plate 28 are located near the other protruded poles 23b and 23c, the total magnetic flux of the field magnet 27 extends through the magnetic path forming protrusions 26a, 28b and 28c to the iron core 23 as indicated by the arrows.

When, under this condition, the field magnet side turns through 45° (the angular interval of the magnetic path forming protrusions), the magnetic path forming protrusion 28a of the yoke plate 28 approaches the protruded pole 23a, while the magnetic path forming protrusions 26c and 26d (N poles) approach the protruded poles 23b and 23c. Therefore, the direction of the total magnetic flux from field magnet 27 is reversed; that is, the total magnetic flux of the field magnet 27 flows in the direction opposite to the direction of the arrows mentioned above.

As is apparent from the above description, in the embodiment, the multi-polarization is substantially obtained by shaping the yoke plates 26 and 28 mounted on the field magnet 27 so as to concentrate the total magnetic flux of the field magnet 27. As a result, the magnetic flux from the field magnet 27 is maximumly utilized at all times, and the number of magnetic poles (P) and the effective magnetic flux (Φ) are both increased. As for the multi-polarization, in the motor of the invention, unlike the conventional multi-polar motor, the field magnet is not subject to multi-polar magnetization. And the armature side is simplified in structure.

Figure 27:
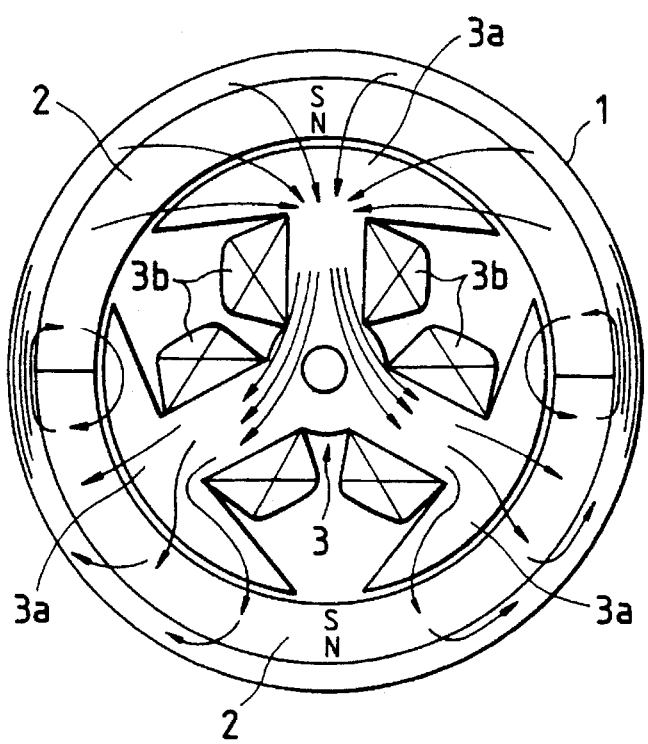
FIG. 27 is an explanatory plan view showing an example of a conventional electric motor.
Figure 28:
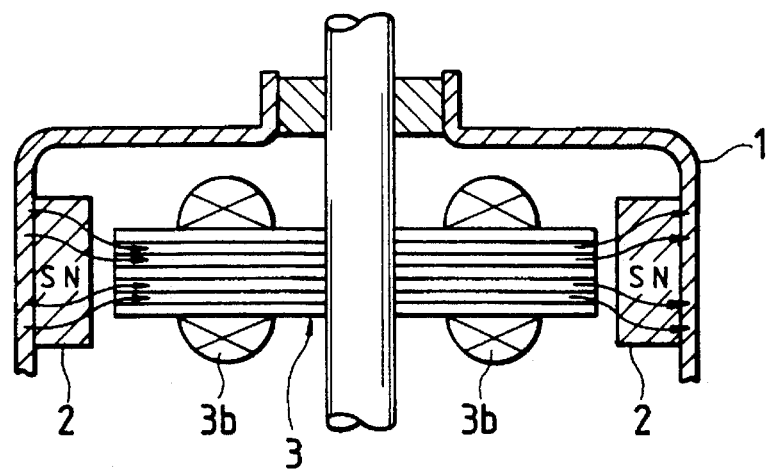
FIG. 28 is an explanatory sectional view showing the structure of the conventional electric motor illustrated in FIG. 27.
Figure 29:
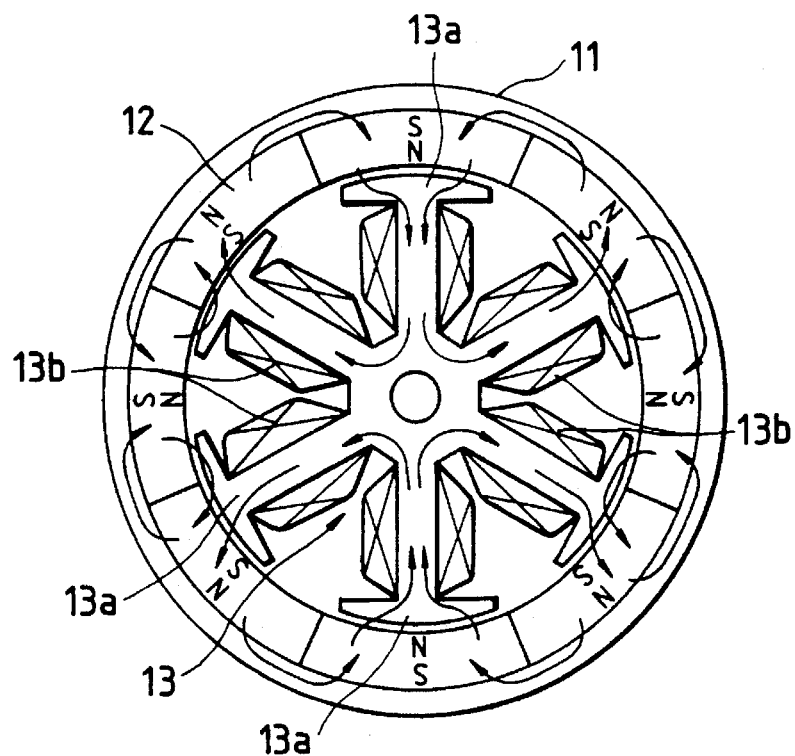
FIG. 29 is an explanatory plan view showing another example of the conventional electric motor.

That is, in the motor of the invention, with the total magnetic flux concentrated similarly as in the motor of "2-3 structure" described with reference to FIGS. 27 and 28, the number of magnetic poles (P) is increased. As is apparent from the above-described Expression (2), the square of the number of magnetic poles (P) contributes to the T/N characteristic value. Therefore, when the number of magnetic poles (P) is tripled, then the T/N characteristic is increased by a factor of nine (9). If, as in the case of the embodiment, the number of magnetic poles (P) is increased by a factor of four (4), then the T/N characteristic value is increased by a factor of sixteen (16). When the number of magnetic poles (P) is increased by a factor of five (5), then the T/N characteristic value is increased by a factor of twenty-five (25). Thus, the T/N characteristic value can be increased greatly.

The torque generated by the motor is proportional to the variation (dΦ/dθ: the gradient of magnetic flux density) per unitary angle θ of the magnetic flux Φ passing through the coil, and the T/N characteristic value is proportional to the square thereof. In this connection, let us compare the following motors with respect to the variation in magnetic flux Φ during one revolution:

(1) Conventional bipolar motor (P=2)

(2) Conventional multi-polar motor (P=10)

(3) Motor of the invention (P=10)

Figure 3:
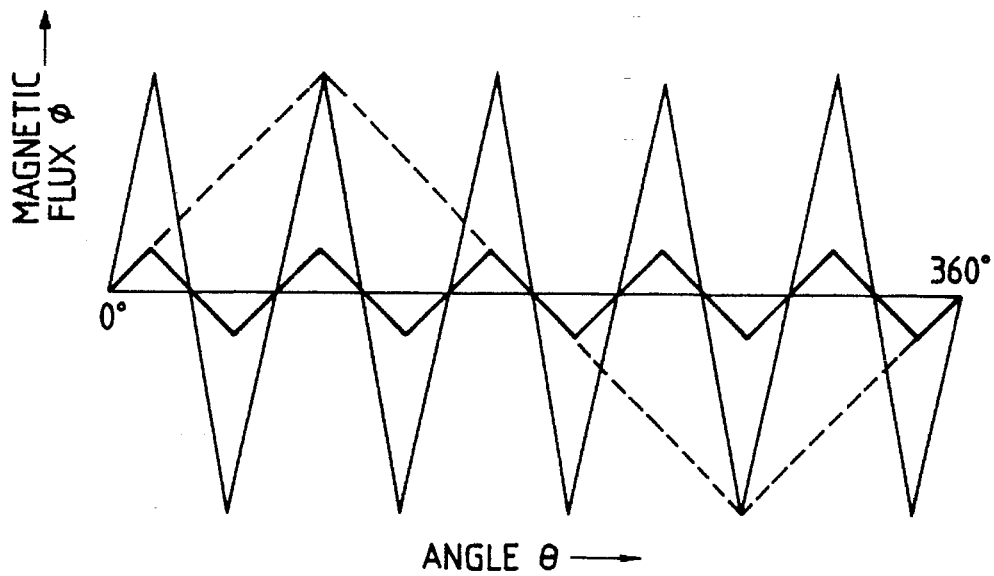
FIG. 3 is a graphical representation indicating the variations in magnetic flux $\Phi$ per revolution of the motor of the invention and other motors.

As is apparent from FIG. 3, in the case of the conventional bipolar motor (1), as indicated by the broken line, the large magnetic flux changes slowly; and in the case of the conventional multi-polar motor (2), as indicated by the heavy line, the magnetic flux Φ changes five times as many as in the case of the conventional bipolar motor (1). In the latter case, the magnetic flux Φ is reduced to ⅕, and therefore the variation (dΦ/dθ: the gradient of magnetic flux density) is equal to that in the former case.

On the other hand, the motor of the invention (3), as indicated by the thin line, concentrates the same total magnetic flux as the conventional bipolar motor (1), and changes the magnetic flux at the same intervals as the conventional multi-polar motor (2). Hence, in the motor of the invention (3), the variation (dΦ/dθ: the gradient of magnetic flux density) is considerably large. If, in this case, it is assumed that the armature sides of those three motors are equal in condition to each other, then the generated torque (or torque constant) of the motor of the invention is five times as great as that of the conventional motors (1) or (2), and the T/N characteristic value is twenty-five times as high as that of the conventional motor (1) or (2).

If, in the iron core 23 of the above-described embodiment, the protruded poles 23a, 23b and 23c corresponding to the three different phases are so arranged as to form series magnetic circuits, then the phases form a common magnetic circuit, and therefore almost all of the total magnetic flux is utilized collectively as effective magnetic flux.

Second Embodiment

Figure 4:
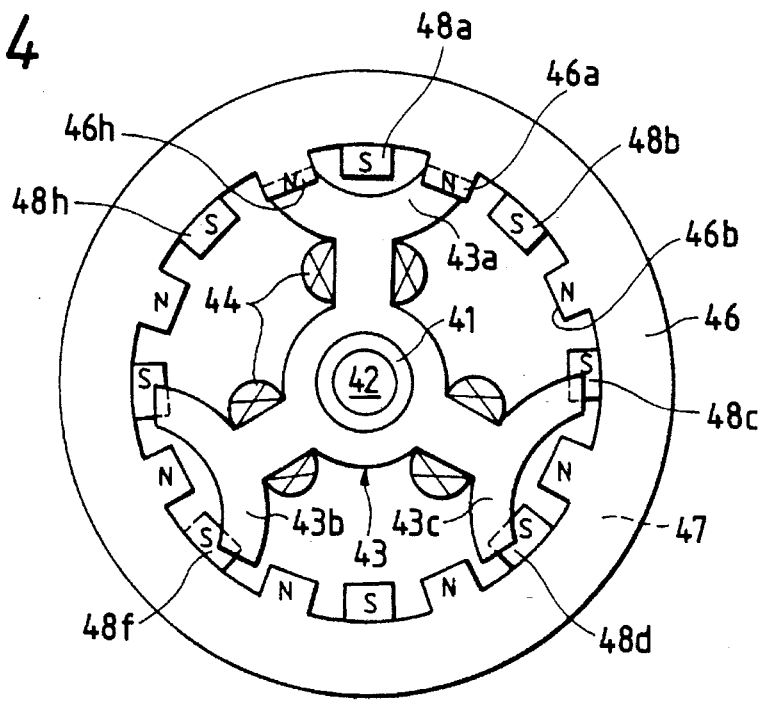
FIG. 4 is an explanatory plan view showing an electric motor, which constitutes a second embodiment of the invention.

A second embodiment of the invention will be described with reference to FIG. 4, in which parts corresponding functionally to those which have been described with reference to FIGS. 1 and 2 (showing the first embodiment) are therefore designated by the same reference numerals with the second digit "2" replaced by "4" (for instance, the reference numeral "26" is changed into "46").

In the second embodiment, in order to make the number of magnetic poles larger than that of the first embodiment, a number of magnetic path forming protrusions 46a through 46h are extended from the inner periphery of the yoke plate 46, and similarly a number of magnetic path forming protrusions 48a through 48h are extended from the inner periphery of the yoke plate 48. The iron core 43 includes protruded poles 43a, 43b and 43c, each of which is fork-shaped. This fork-shaped structure reduces the burden to the yoke plates.

Third Embodiment

Figure 5:
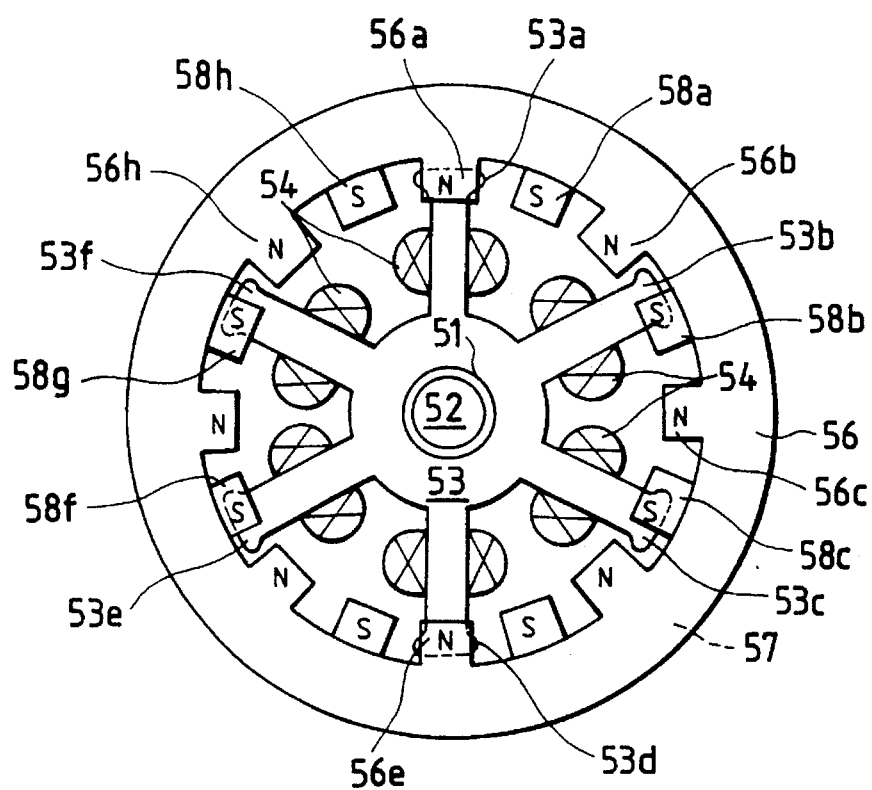
FIG. 5 is an explanatory plan view showing an electric motor, which constitutes a third embodiment of the invention.

A third embodiment of the invention will be described with reference to FIG. 5, in which parts corresponding functionally to those which have been described with reference to FIGS. 1 and 2 (showing the first embodiment) are therefore designated by the same reference numerals with the second digit "2" replaced by "5".

In the third embodiment, too, the multi-polarization is obtained by increasing the numbers of the magnetic path forming protrusions of the yoke plates. That is, the yoke plate 56 includes magnetic path forming protrusions 56a through 56h, while the yoke plate 56 includes magnetic path forming protrusions 58a through 58h. In addition, the number of protruded poles of the iron core 53 is increased; that is, in the third embodiment, the iron core 53 has six protruded poles 53a through 53f.

Fourth Embodiment

Figure 6:
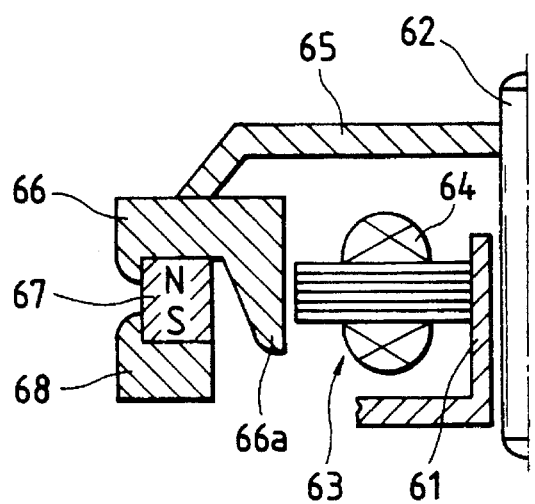
FIG. 6 is an explanatory sectional view showing an electric motor, which constitutes a fourth embodiment of the invention.

A fourth embodiment of the invention will be described with reference to FIG. 6, in which parts corresponding functionally to those which have been described with reference to FIGS. 1 and 2 (showing the first embodiment) are therefore designated by the same reference numerals with the second digit "2" replaced by "6".

In the fourth embodiment, the magnetic path forming protrusions 66a, ... and 68a, ... of the yoke plates 66 and 68 are each substantially L-shaped in section so that they have surfaces which are axially extended to confront with the peripheral end faces of the iron core 63 of the armature.

Fifth Embodiment

Figure 7:
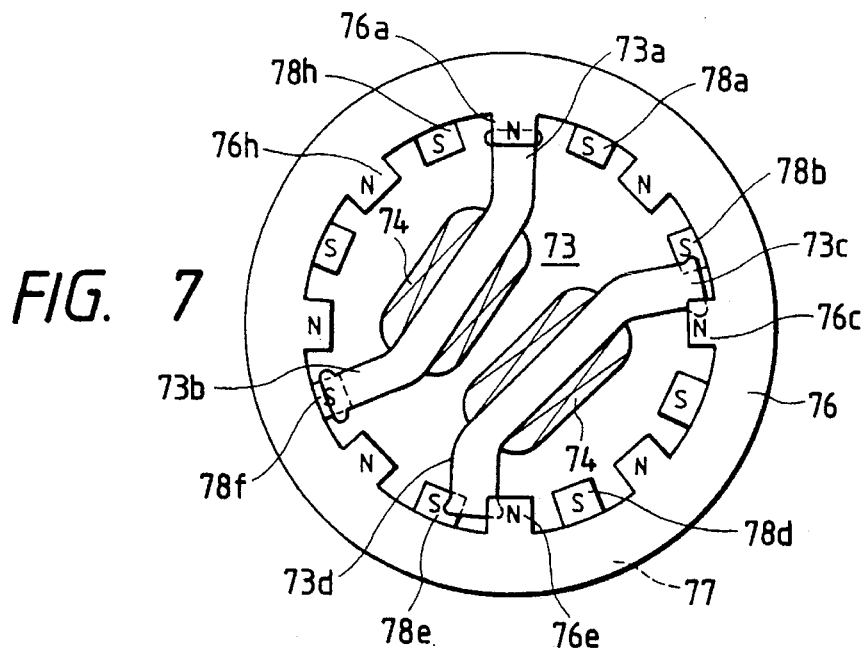
FIG. 7 is an explanatory plan view showing an electric motor, which constitutes a fifth embodiment of the invention.

A fifth embodiment of the invention will be described with reference to FIG. 7, in which parts corresponding functionally to those which have been described with reference to FIGS. 1 and 2 (showing the first embodiment) are therefore designated by the same reference numerals with the second digit "2" replaced by "7". In the fifth embodiment, the technical concept of the invention is applied to a two-phase motor.

In the fifth embodiment, the armature has a pair of iron cores 73 and 73. One of the iron cores 73 includes protruded poles 73a and 73b, and similarly the other iron core includes protruded poles 73c and 73d. Those protruded poles 73a through 73d are moved towards or away from the magnetic path forming protrusions 76a through 76h of the yoke plate 76 and the magnetic path forming protrusion 78a through 78h of the yoke plate 78.

As is apparent from the above-described embodiments, in the motor of the invention, the armature and the field magnetic may be shaped in various manners, with the same effects and functions. Furthermore, in each of the above-described embodiments, the armature is located inside the field magnet; Of course, the armature may be provided outside the field magnet. In addition, the motor may be so designed that the armature and the field magnet are on the stationary side and on the rotatable side, respectively, or vice versa.

Figure 8:
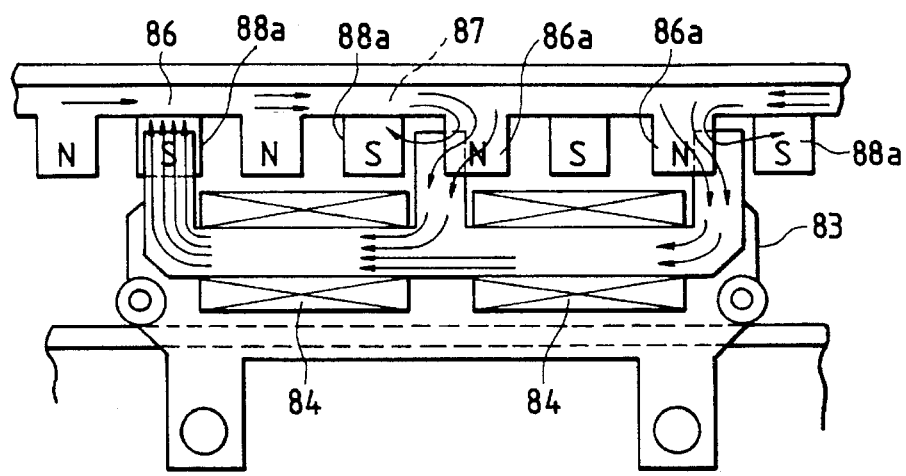
FIG. 8 is an explanatory plan view showing an electric motor, which constitutes a sixth embodiment of the invention.
Figure 9:
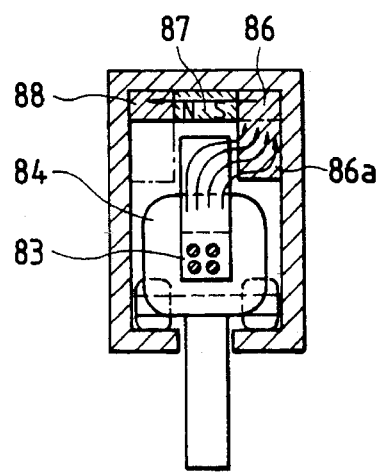
FIG. 9 is an explanatory sectional view showing the structure of the motor shown in FIG. 8.

The technical concept of the invention may be applied to a linear motor as shown in FIGS. 8 and 9, which constitutes a sixth embodiment of the invention. In the motor shown in FIGS. 8 and 9, two iron cores 83 and 83 forming the armature are juxtaposed on one side, and a field magnet 87 is arranged near the iron cores 83 in such a manner that it is slidable with respect to the latter 83. The iron cores 83 includes protruded poles 83a, on which the exciting coils 84 are wound.

The field magnet 87 is magnetized vertically, or in a direction perpendicular to its longitudinal direction. In the embodiment, the field magnet 87 is so magnetized that the left end face is an N pole, and the right end face is an S pole. Yoke plates 86 and 88 are secured to the end faces of the field magnet 87, respectively, which has been magnetized in the above-described manner. A plurality of magnetic path forming protrusions 86a are extended from the edge of the yoke plate 86 towards the iron core 83, and similarly a plurality of magnetic path forming protrusions 88a are extended from the edge of the yoke plate 88 towards the iron core 83. Those magnetic path forming protrusions 86a and 88a are moved in parallel while embracing the iron core 83 therebetween. That is, as the armature's iron core 83 and the magnetic path forming protrusions 86a and 88a of the yoke plates 86 and 88 are moved relative to each other, they are moved towards or away from each other. When they are positioned near each other, the magnetic flux of the field magnet 87 is extended collectively to the iron core 83.

When, in the linear motor, the magnetic path forming protrusion 86a (N pole) of the yoke plate 86 comes near one protruded pole 83a of the armature, and the magnetic path forming protrusion 88a (S pole) of the yoke plate 88 comes near another protruded pole 83a of the armature, the total magnetic flux of the field magnet 87 is collected at the iron core 83. When, under this condition, the magnetic path forming protrusions and the protruded poles are moved relative to each other; that is, when the magnetic path forming protrusion 88a (S pole) of the yoke plate 88 comes near the protruded pole 83a, and the magnetic path forming protrusion 86a (N pole) of the yoke plate 86 comes near another protruded pole 83b, the magnetic flux of the field magnet 87 is reversed in direction when collected at the iron core 83.

As is apparent from the above description, in the fifth embodiment, too, the multi-polarization is substantially obtained by shaping the pair of yoke plates 86 and 88 mounted on the field magnet 87 so as to concentrate the total magnetic flux of the field magnet 87. As a result, the magnetic flux from the field magnet 87 is maximumly utilized at all times, and the number of magnetic poles (P) and the effective magnetic flux ($\Phi$) are both increased. As for the multi-polarization, in the motor of the invention, unlike the conventional multi-polar motor, the field magnet is not subjected to multi-polar magnetization. And the armature side is simplified in structure.

Sixth Embodiment

Figure 10:
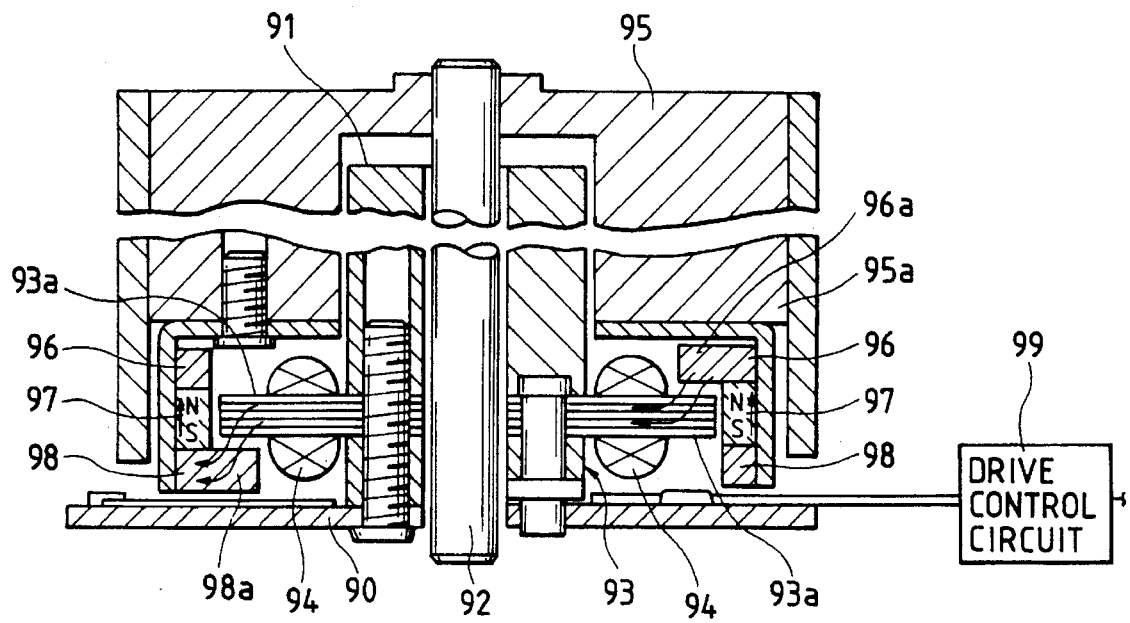
FIG. 10 is an explanatory sectional view showing the structure of a brushless motor, which constitutes a seventh embodiment of the invention.

FIG. 10 shows a brushless motor such as a three-phase stepping motor, which constitutes a sixth embodiment of the invention.

As shown in FIG. 10, a rotary shaft 92 is rotatably supported in a hollow-cylinder-shaped bearing holder 91, which is held at the center of a base 90. The iron core 93 of the armature is fixedly mounted on the bearing holder 91, thus forming the stator of the motor. The iron core 93 is formed by stacking a plurality of silicon steel strips or the like to a predetermined thickness. The iron core 93 includes three protruded poles 93a which are arranged around the rotary shaft at angular intervals of 120° while being radially extended. And three-phase exciting coils 94 are wound on the middle portions of those protruded poles 93a, respectively.

On the other hand, a cylindrical rotary member 95 is fixedly mounted on the upper end portion of the rotary shaft 92 so that it rotates together with the latter 92, thus forming the rotor of the motor. A cup-shaped casing 95a made of non-magnetic material is coaxially mounted on the lower surface of the rotary member 95. An annular field magnet 97 is fixedly mounted on the inner surface of the flange-like cylindrical wall of the casing 95a. The field magnet 97 is in the form of a hollow cylinder which surrounds the outer end faces of the protruded poles 93a of the armature with a predetermined gap therebetween. The field magnet 97 is adapted to rotate around the armature, which is on the stationary side.

Yoke plates 96 and 98 are provided on the upper and lower end faces of the field magnet 97, respectively, which are magnetized as required. The yoke plates 96 and 98 are annular, and made of ferromagnetic material. Those yoke plates 96 and 98 are suitably set on the magnetized upper and lower end faces of the field magnet 97, respectively. The upper end face of the field magnet 97 is of N pole, and therefore the yoke plate 96 mounted it is magnetized into N pole; while the lower end face of the field magnet 97 is of S pole, and therefore the yoke plate 98 mounted on it is magnetized into S pole.

Four magnetic path forming protrusions 96a are extended from the inner periphery of the yoke plate 96 towards the central axis, and similarly four magnetic path forming protrusions 98a are extended from the inner periphery of the yoke plate 98 towards the central axis. The magnetic path forming protrusions 96a of the yoke plate 96, and the magnetic path forming protrusions 98a of the yoke plate 98 are turned while embracing the armature's iron core 93 therebetween. That is, the armature's iron core 93, and the magnetic path forming protrusions 96a and 98a of the yoke plates 96 and 98 are moved towards and away from each other when moved relative to each other, and therefore when the former and the latter are positioned near each other, the magnetic flux of the field magnet 97 is collectively extended through the magnetic path forming protrusions 96a and 98a of the yoke plates 96 and 98 to the iron core 93. The thickness of the magnetic path forming protrusions 96a and 98a, and the confronting length of them over the iron core 93, are substantially equal to the thickness of the iron core 93.

The magnetic path forming protrusions 96a of the yoke 96 are arranged around the central axis at angular intervals of 90°, and similarly the magnetic path forming protrusion 98a of the yoke plate 98 are arranged around the central axis at angular intervals of 90°. And the magnetic path forming protrusions 96a of the yoke plate 96, and the magnetic path forming protrusions 98a of the yoke plate 98 are shifted 45° around the central axis from each other. That is, in the top view of the yoke plates 96 and 98, the magnetic path forming protrusions 96a magnetized to N pole, and the magnetic path forming protrusions 98a magnetized to S pole are alternately arranged around the central axis at angular intervals of 45°, in the order of one protrusion 96a of the yoke plate 96, one protrusion 98a of the yoke plate 98, the next protrusion 96a of the yoke plate 96, the next protrusion 98a of the yoke plate 98, and so forth. Thus, eight magnetic poles are provided without multi-polar magnetization. Hence, the direction of magnetic flux passing through the part of the iron core 93 on which the coil 94 is wound is reversed every angular interval (45°) of the magnetic path forming protrusions of the two yoke plates.

A lead wire is connected between the base 90 and a drive control circuit 99 provided outside the motor.

When, in the brushless motor, the armature side and the field magnet side are positioned as shown in FIG. 10; more specifically, when one magnetic path forming protrusion 96a (N pole) of the yoke plate 96 is near one protruded pole 93a of the iron core 93, and a pair of magnetic path forming protrusions 98a and 98a (S poles) are near two other protruded poles 93a and 93a, the total magnetic flux of the field magnet 97 are collectively extended through the magnetic path forming protrusions 96a, . . . to the iron core as indicated by the arrows in FIG. 10.

When, under this condition, the field magnet side turns 45° corresponding to the angular interval of the magnetic path forming protrusions, one magnetic path forming protrusion 98a (S pole) of the yoke plate 98 approaches the protruded pole 93a, and a pair of magnetic path forming protrusions 96a (N pole) of the yoke plate 96 approaches the protruded pole 93a. Therefore, the direction of the magnetic flux from the field magnet 97 is reversed; that is, the magnetic flux is caused to flow in the direction opposite to the direction of the arrows.

Seventh Embodiment

Figure 11:
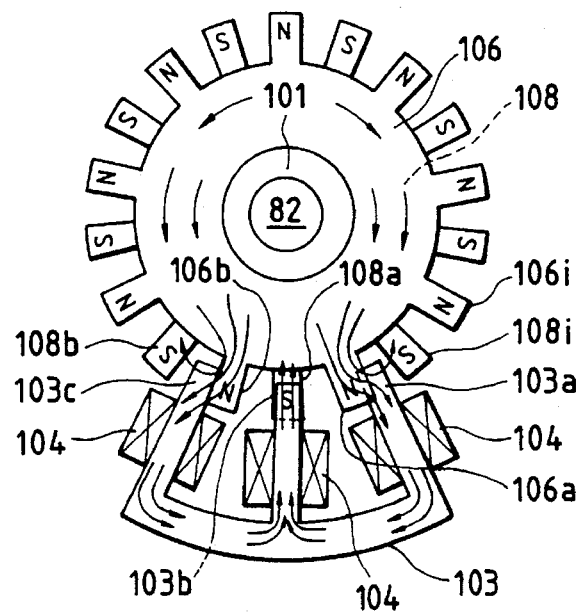
FIG. 11 is an explanatory plan view showing a brushless motor, which constitutes an eighth embodiment of the invention.
Figure 12:
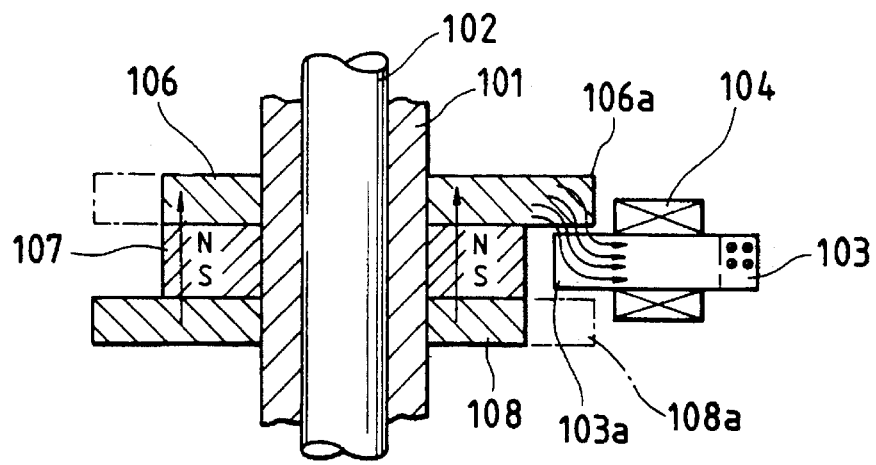
FIG. 12 is a fragmentary explanatory sectional view showing the structure of an essential part of the brushless motor illustrated in FIG. 11.

A seventh embodiment of the invention will be described with reference to FIGS. 11 and 12, in which parts corresponding functionally to those which have been described with reference to FIG. 10 (showing the sixth embodiment) are therefore designated by the same reference numerals with the second digit "9" replaced by "10".

In the seventh embodiment, unlike the above-described embodiment, the field magnet is set inside the armature. That is, an armature's iron core 103 and coils 104 are arranged around a cylindrical field magnet 107 forming the rotor of the motor, thus forming the stator of the motor. The iron core 103 includes three protruded poles 103a, 103b and 103c, and it is arranged only in one part of the circumference.

Eighth Embodiment

Figure 13:
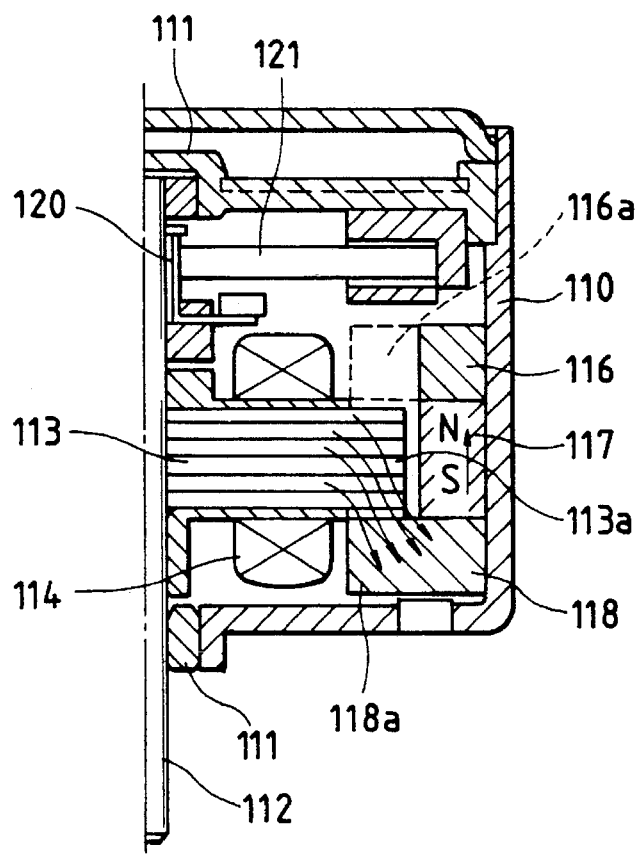
FIG. 13 is an explanatory sectional view showing a half of a small motor, which constitutes a ninth embodiment of the invention.

FIG. 13 shows a three-phase brush-operated small motor, which constitutes an eighth embodiment of the invention.

In FIG. 13, reference numeral 110 designates a hollow-cylinder-shaped casing made of non-magnetic material, and two bearings 111 and 111 are provided at the centers of two end faces of the casing 110, respectively, to rotatably supporting a rotary shaft 112. An armature's iron core 113 forming the rotor of the motor is fixedly mounted on the rotary shaft 112. Three-phase coils 114 are wound on the iron core 113. The iron core 113 is formed by stacking a plurality of silicon steel strips or the like to a predetermined thickness, and includes three protruded poles 113a, 113b and 113c which are arranged around the rotary shaft at angular intervals of 120° while being extended radially. The aforementioned coils 114 are wound on the middle portions of the protruded poles 113a, 113b and 113c.

An annular field magnet 117 is fixedly mounted on the inner cylindrical surface of the casing 110, thus forming the stator of the motor. The field magnet 117 is in the form of a hollow cylinder which surrounds the outer end faces of the protruded poles 113a, 113b and 113c of the armature's iron core 113 with a predetermined gap therebetween.

Two yoke plates 116 and 118 are fixedly mounted on the magnetized upper and lower end faces of the field magnet 117, respectively. Those yoke plates are each in the form of a ring, and made of ferromagnetic material. The yoke plates 116 and 118 are suitably mounted on the magnetized upper and lower end faces of the field magnet 117. The upper end face of the field magnet 117 is an N pole, and therefore the yoke plate 116 mounted on it is magnetized into N pole. The lower end face of the field magnet 117 is an S pole, and therefore the yoke plate 118 on it is magnetized into S pole.

Four magnetic path forming protrusions 116a are extended from the inner periphery of the yoke plate 116 towards the central axis, and similarly four magnetic path forming protrusions 118a are extended rom the inner periphery of the yoke plate 118 towards the central axis. The magnetic path forming protrusions 116a of the yoke plate 116, and the magnetic path forming protrusions 118a of the yoke plate 118 are turned while embracing the armature's iron core 113 therebetween. That is, the armature's iron core 113, and the magnetic path forming protrusions 116a and 118a of the yoke plates 116 and 118 are moved towards and away from each other while being moved relative to each other, and therefore when the former and the latter are positioned near each other, the magnetic flux of the field magnet 117 is collectively extended through the magnetic path forming protrusions 116a and 118a of the yoke plates 116 and 118 to the iron core 113. The thickness of the magnetic path forming protrusions 116a and 118a, and the confronting length of them over the iron core 113 are substantially equal to the thickness of the iron core 113.

The magnetic path forming protrusions 116a of the yoke 116 are arranged around the central axis at angular intervals of 90°, and similarly the magnetic path forming protrusion 118a of the yoke plate 118 are arranged around the central axis at angular intervals of 90°. And the magnetic path forming protrusions 116a of the yoke plate 116, and the magnetic path forming protrusions 118a of the yoke plate 118 are shifted 45° around the central axis from each other. That is, in the top view of the yoke plates, the magnetic path forming protrusions 116a magnetized to N pole, and the magnetic path forming protrusions 118a magnetized to S pole are alternately arranged around the central axis at angular intervals of 45°, in the order of one protrusion 116a of the yoke plate 116, one protrusion 118a of the yoke plate 118, the next protrusion 116a of the yoke plate 116, the next protrusion 118a of the yoke plate 118, and so forth. Thus, eight magnetic poles are provided without multi-polar magnetization. Hence, the direction of magnetic flux passing through the part of the iron core 113 on which the coil 114 is wound, is reversed every angular interval (45°) of the magnetic path forming protrusions of the two yoke plates.

An annular commutator 120 for three-phase current is mounted on the rotary shaft 112. Brushes 12 for three-phase current are fixedly provided on the casing 110 in such a manner that they are in contact with the commutator 120. Three-phase current is supplied through the brushes 121 and the commutator 120 to the armature's coils 114.

When, in the small motor, the armature side and the field magnet side are positioned as shown in FIG. 13; more specifically, when one magnetic path forming protrusion 116a (N pole) of the yoke plate 116 is near one protruded pole 113a of the iron core 113, and a pair of magnetic path forming protrusions 118a and 118a (S poles) of the yoke plate 118 are near another protruded pole 113a, the total magnetic flux of the field magnet 117 are collectively extended through the magnetic path forming protrusions 116a, . . . to the iron core as indicated by the arrows in FIG. 13.

When, under this condition, the field magnet side turns 45° corresponding to the angular interval of the magnetic path forming protrusions, one magnetic path forming protrusion 118a (S pole) of the yoke plate 118 approaches the protruded pole 113a, and a pair of magnetic path forming protrusions 116a (N pole) of the yoke plate 116 approach the protruded poles 113a and 113a. Therefore, the direction of the magnetic flux from the field magnet 117 is reversed; that is, the magnetic flux is caused to flow in the direction opposite to the direction of the arrows.

Tenth Embodiment

Figure 14:
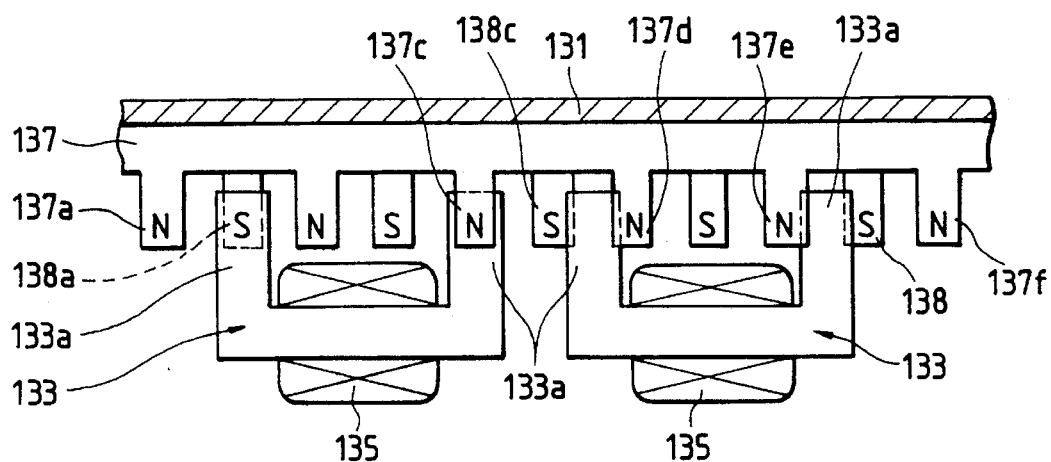
FIG. 14 is an explanatory plan view showing a linear motor, which constitutes a tenth embodiment of the invention.
Figure 15:
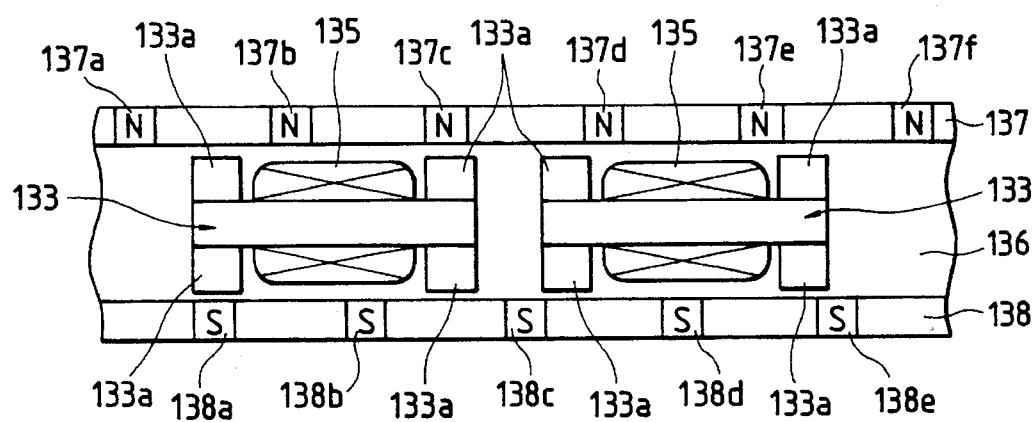
FIG. 15 is an explanatory front view showing the structure of the linear motor shown in FIG. 14.

FIGS. 14 and 15 show a two-phase linear motor, which constitutes a tenth embodiment of the invention.

In FIGS. 14 and 15, reference numeral 131 designates an elongated casing 131 rectangular in section which is made of non-magnetic material. Armature's iron cores 133 are arranged inside the casing 131 in such a manner that they are parallel reciprocated along the longitudinal axis. More specifically, two iron cores 133 and 133 are extended in the direction of movement of them (horizontally in FIGS. 14 and 15). Exciting coils 135 are wound on the barrels (middles) of the iron cores 133, respectively. Each of the iron cores 133 and 133, which are extended substantially horizontally, includes two protruded poles 133a and 133a which are extended vertically in FIG. 14. The end portions of those protruded poles 133a are set close to a number of magnetic path forming protrusions 137a, 137b, 137c, 137d, . . . extended from the edge of a yoke plate 137 on the armature side, and to a number of magnetic path forming protrusions 138a, 138b, 138c, 138d, . . . extended from the edge of a yoke plate 138 on the armature side.

An elongated field magnet 136 is fixedly mounted on the inner surface of the top wall of the casing 131 in such a manner that it is extended along the direction of movement of the armature. More specifically, the field magnet 131 is so arranged that it confronts with the end faces of the protruded poles 133a of the iron cores 133. The field magnet 131 is made of ferrite or rare earth material. The field magnet 131 is magnetized in a direction perpendicular to its longitudinal direction (horizontally in the figure). In the embodiment, the upper edge portion (in the figure) of the field magnet 136 is magnetized into N pole, and the lower edge portion is magnetized into S pole.

The yoke plates 138 and 137 are made of ferromagnetic materials, and are laid on the magnetized upper and lower edges of the field magnet 136, respectively. The yoke plate 137 mounted on the upper edge (N pole) of the field magnet 136 is magnetized into N pole; whereas the yoke plate 138 mounted on the lower edge (S pole) of the field magnet 136 is magnetized into S pole.

The magnetic path forming protrusions 137a, 137b, . . . of the yoke plate 137, and the magnetic path forming protrusions 138a, 138b, . . . of the yoke plate 138, are arranged at predetermined intervals while embracing the iron cores 133 therebetween. That is, the armature's iron cores 133, and the magnetic path forming protrusions 137a, . . . and 138a, . . . of the yoke plates 137 and 138 are moved towards and away from each other while being moved relative to each other, and therefore when the former and the latter are positioned near each other, the magnetic flux of the field magnet 136 is collectively extended through the magnetic path forming protrusions 137a, . . . and 138a, . . . of the yoke plates 137 and 138 to the iron core 133. The thickness of each of the magnetic path forming protrusions 137a, . . . and 138a, . . . , and the confronting length thereof over the iron core 133 are substantially equal to the thickness of the iron core 133.

The magnetic path forming protrusions 137a, . . . and 138a of the yoke plates 137 and 138 are so arranged that they are in parallel with each other, and shifted in such a manner that a magnetic path forming protrusion of one of the yoke plates is located at the middle of the space between two adjacent magnetic path forming protrusions of the other yoke plate. That is, in the top view of the yoke plates, the magnetic path forming protrusions 137a, . . . magnetized to N pole, and the magnetic path forming protrusions 138a, . . . magnetized to S pole are alternately arranged, in the order of one protrusion 137a of the yoke plate 137, one protrusion 138a of the yoke plate 138, the next protrusion 137b of the yoke plate 137, the next protrusion 138b of the yoke plate 138, and so forth. Hence, the direction of magnetic flux passing through the part of the iron core 133 on which the coil 135 is wound, is reversed every interval of the magnetic path forming protrusions 137a, . . . and 138a, . . . of the two yoke plates 137 and 138.

Eleventh Embodiment

Figure 16:
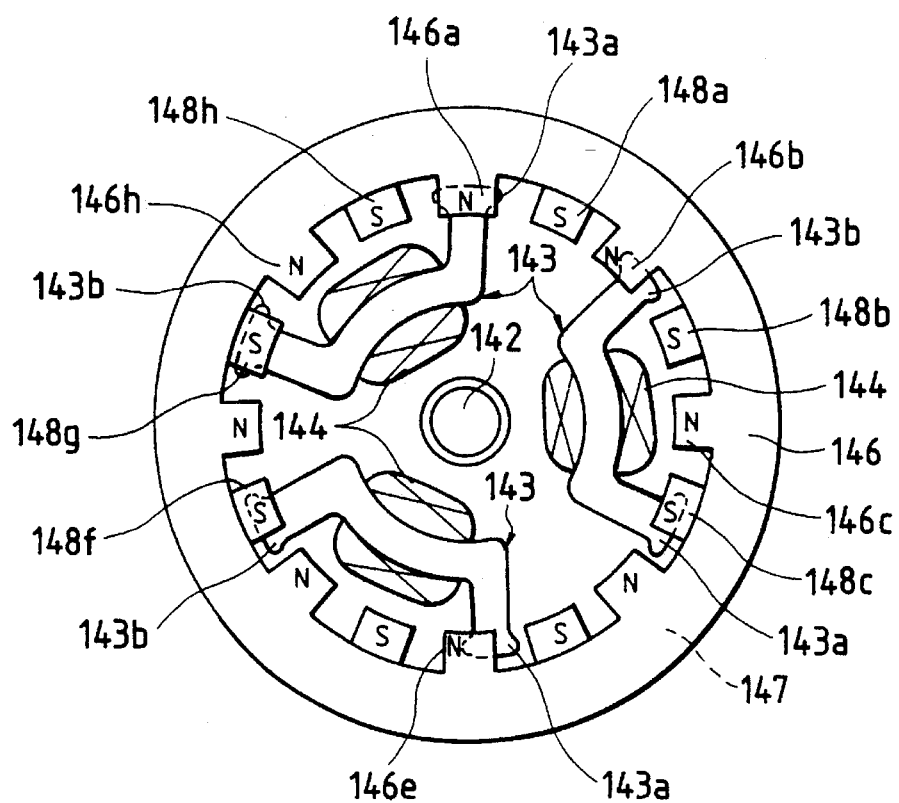
FIG. 16 is an explanatory plan view showing an electric rotary machine, which constitutes an eleventh embodiment of the invention.

An eleventh embodiment of the invention will be described with reference to FIG. 16, in which parts corresponding functionally to those which have been described with reference to FIGS. 1 and 2 (showing the first embodiment) are therefore designated by the same reference numerals with the second digit "2" replaced by "14".

In the eleventh embodiment, three iron cores 143, 143 and 143 corresponding to different phases are arranged around the central axis at angular intervals, so that they form parallel magnetic circuits. Each of the three iron cores 143 has two protruded poles 143a and 143a. The other arrangement is similar to that of the first embodiment.

Twelfth Embodiment

A twelfth embodiment of the invention will be described with reference to FIG. 17, in which parts corresponding functionally to those which have been described with reference to FIGS. 1 and 2 (showing the first embodiment) are therefore designated by the same reference numerals with the second digit "2" replaced by "15".

An armature's iron core 153, and the magnetic path forming protrusions 156a, ... and 158a of two yoke plates 156 and 158 are confronted with each other, and moved away from each other while being rotated relative to each other; that is, when the former and the latter are confronted with each other, the magnetic path forming protrusions 156a, ... and 158a forming the rotor are brought into contact with the protruded poles 153a, 153g, 153c of the iron core 153. When the magnetic path forming protrusions 156a, ... and 158a are brought into contact with the protruded poles 153a, 153g, 153c of the iron core 153, the magnetic flux of the field magnet 157 is collectively extended through the magnetic path forming protrusions 156a, ... and 158a of the yoke plates 156 and 158 to the core 153. The thickness of each of the magnetic path forming protrusions 156a, ... and 158a, ... , and the confronting length thereof over the iron core 153 are substantially equal to the thickness of the iron core 153.

Figure 17:
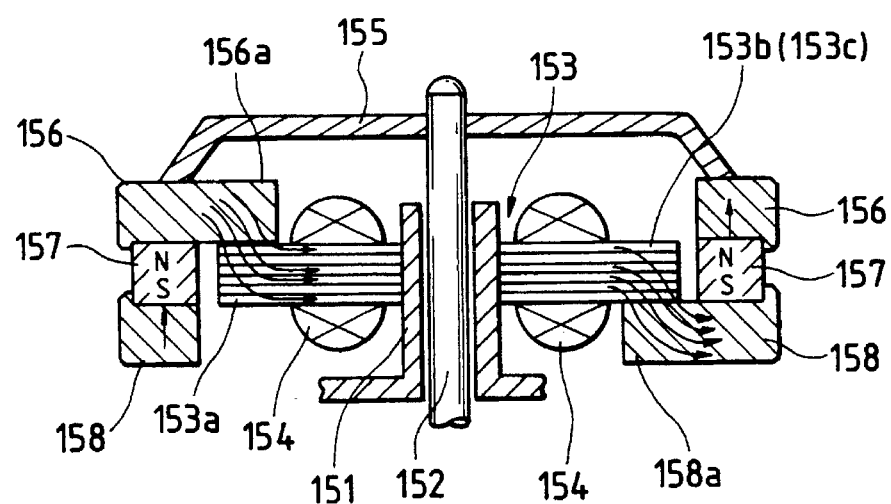
FIG. 17 is an explanatory plan view showing an electric rotary machine, which constitutes a twelfth embodiment of the invention.

When the armature side and the field magnet side are positioned as shown in FIG. 17; that is, when one magnetic path forming protrusion 156a (N pole) of the yoke plate 156 is in surface contact with the protruded pole 153a, and a pair of magnetic path forming protrusions 158b and 158c (S pole) of the yoke plate 158 are in surface contact with the protruded poles 153b and 153c, the magnetic flux from the field magnet 157 is collectively extended through the magnetic path forming protrusions 156a, 158b and 158c.

As was described above, in the twelfth embodiment, the magnetic path forming protrusions 156a, ... and 158a, ... forming the rotor are brought into contact with the protruded poles 153a, 153b and 153c of the iron core 153 when confronted with the latter. Hence, when the former and the latter are confronted with each other, the magnetic reluctance is reduced to lower than a predetermined value. Thus, the T/N characteristic value is further improved as described below.

First, the effects of the air gap between the core on the rotor side and the core on the stator side on the magnetic reluctance, will be described through comparison of the thrust forces which are generated by the above-described motors of flux concentration and reversion type according to the invention, a conventional motor of magnet confrontation type, and a motor of reluctance type.

Figure 18:
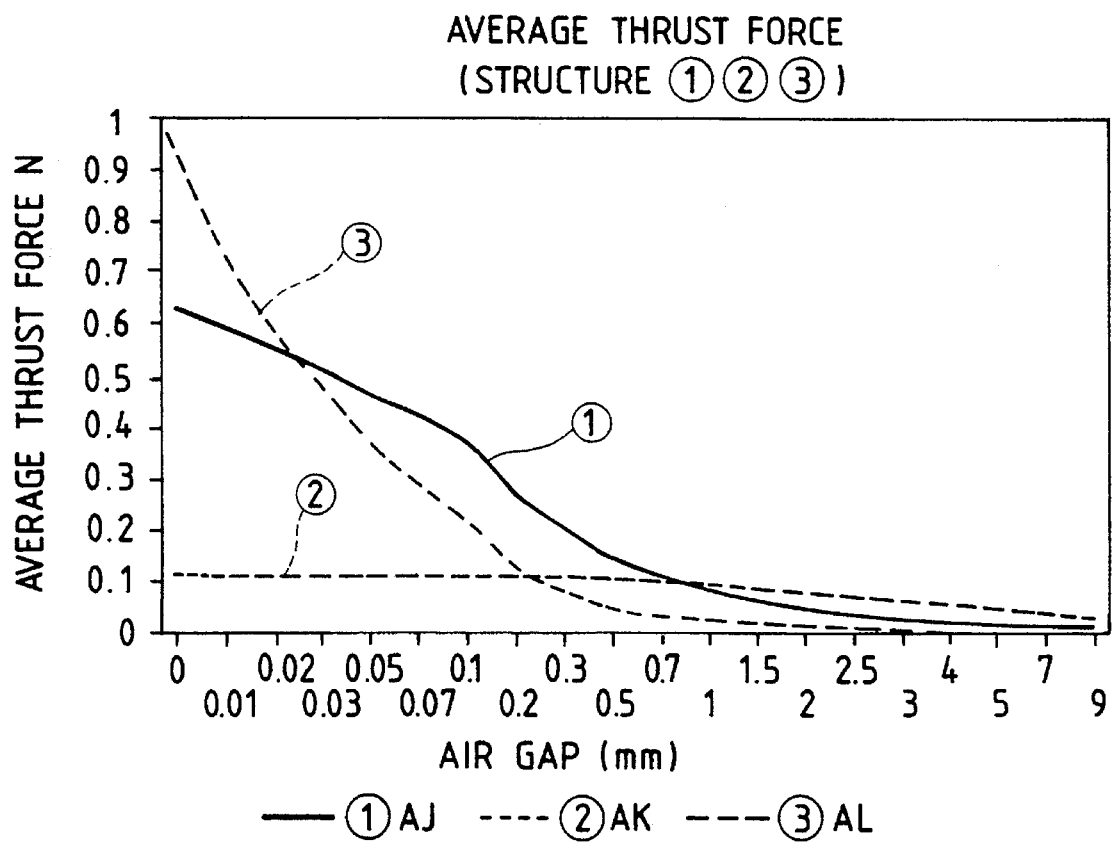
FIG. 18 is a graphical representation indicating air gap with thrust force.

As shown in FIG. 18, in the case where the aforementioned three different motors are the same in configuration and under the same conditions, the relationship between air gap (horizontal axis) and average thrust force (vertical axis) depends greatly on the structure of the motor. The motor of reluctance type ((3) AL) is most greatly affected by the air gap, the motor of magnetic flux concentration and inversion type ((2) AK) is next, and the conventional motor of magnet confrontation type ((1) AJ) are scarcely affected by the air gap.

That is, in the case of the motor of reluctance type ((3) AL) and in the case of the motor of magnetic flux concentration and reversion type, by sufficiently reducing the air gap, the thrust force can be increased several times that of the conventional motor of magnet confrontation type ((2) AK), and the T/N characteristic value can be obtained which is the square thereof. However, it is considerably difficult to manufacture a motor in which the air gap between the cores is less than a predetermined value, and, under this condition, those cores are not in contact with each other. Hence, the motor of the invention is so designed that it is operable even if the cores are in contact with each other; that is, it is so designed that the cores are in contact with each other, and yet the thrust force is maximum. Thus, the invention is most effective when its technical concept is applied to electric motors of reluctance type or flux concentration and reversion type.

In this connection, it is preferable that the core on the rotor side and the core on the stator side are so urged by attracting means such as a spring and magnetic attracting means that they are brought into contact with each other. In this case, even when the motor is vibrated or shocked, the contact between those cores is maintained satisfactory, and therefore the motor rotates stably. This method is applicable particularly to the motor of reluctance type in which the cores can be urged by a small attracting force. In this case, the attracting means should be arranged at the center of rotation. For instance, a magnet may be provided on the thrust bearing of the rotary shaft to attract the core on the rotor side to the core on the stator side, or a leaf spring may be provided in such a manner that its end portion contacts the core on the rotor side.

In order to decrease the coefficient of friction between the core on the rotor side and the core on the stator side, lubricant such as grease may be applied to the contact surfaces of those cores, or the cores are allowed to contact with each other through a thin sheet, or the contact surfaces may be subjected to surface-treatment. The motor thus processed is improved in rotation, and accordingly in durability.

Alternatively, at least one of the contact surfaces of the cores on the rotor side and on the stator side may be made planar in its entirety. In this case, too, the motor is improved in rotation, and accordingly in duration. More specifically, the spaces between the protruded-pole-shaped cores arranged at predetermined intervals may be filled with resin or the like by molding.

In addition, the same effect can be obtained by forming slide guide surfaces such as tapered surfaces or curved surfaces at the front ends, in the direction of rotation, of the contact surfaces of the core on the rotor side and the core on the stator side. The slide guide surface may formed on both of the contact surfaces of the cores, or on one of them.

Thirteenth Embodiment

A thirteenth embodiment of the invention will be described with reference to FIG. 19, in which parts corresponding functionally to those which have been described with reference to FIGS. 1 and 2 (showing the first embodiment) are therefore designated by the same reference numerals with the second digit "2" replaced by "16".

In the embodiment, an armature's iron core 163, and the magnetic path forming protrusions 166a, ... and 168a, ... of two yoke plates 166 and 168, are repeatedly confronted with and moved away from each other as they are turned relative to each other. The space between the magnetic path forming protrusions 166a, ... and 168a... forming the core on the rotor side and the protruded poles 163a, 163b and 163c of the iron core 63 forming the core on the stator side is filled with a magnetic fluid 169 which is flowable and magnetically permeable. The magnetic fluid 169 is held by the magnetic forces provided on the side of the magnetic path forming protrusions 166a, ... and 168a, ... That is, when the iron core and the magnetic path forming protrusions are confronted with each other in the direction of axis, the magnetic path forming protrusions 166a, ... and 168a, ... are brought into contact with the protruded poles 163a, 163b and 163c of the iron core 163 through the magnetic fluid 169; and when the magnetic path forming protrusions 166a, ... and 168a, ... are confronted with the protruded poles 163a, 163b and 163c of the iron core 163, the magnetic flux of the field magnet 167 is collectively extended through the magnetic path forming protrusions 166a, ... and 168a, ... of the yoke plates 166 and 168 and through the magnetic fluid 169 to the iron core 163. The thickness of each of the magnetic path forming protrusions 166a, ... and 168a, ... , and the confronting length thereof over the iron core 183 are substantially equal to the thickness of the latter 183.

Figure 19:
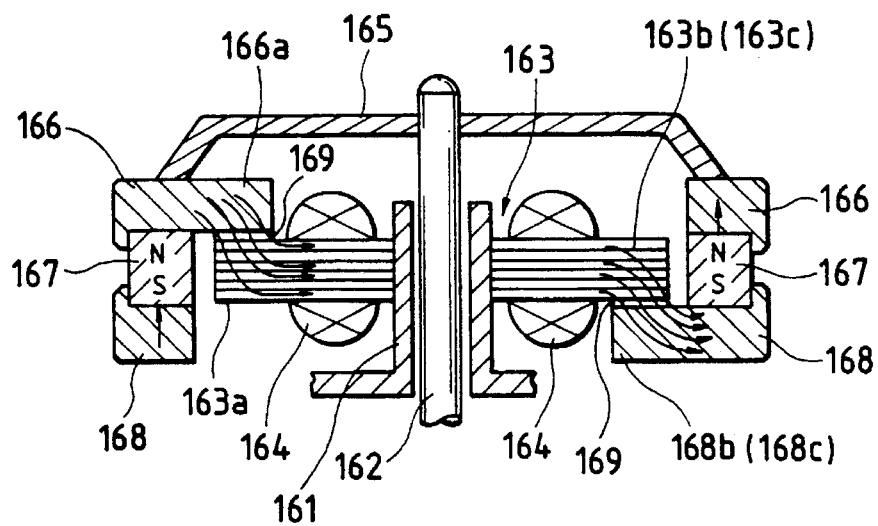
FIG. 19 is an explanatory sectional view showing an electric rotary machine, which constitutes a thirteenth embodiment of the invention.

When, in the motor, the armature side and the field magnet side are positioned as shown in FIG. 19; more specifically, when one magnetic path forming protrusion 166a (N pole) of the yoke plate 166 is confronted through the magnetic fluid 169 with one protruded pole 163a of the iron core 163, and a pair of magnetic path forming protrusions 168b and 168c (S poles) of the yoke plate 168 are confronted through the magnetic fluid 169 with the other protruded poles 163a and 163a, the total magnetic flux of the field magnet 167 are collectively extended through the magnetic path forming protrusions 166a, 168b and 168c and through the magnetic fluid 169 to the iron core 163 as indicated by the arrows.

In this case, because of the presence of the magnetic fluid 169, the magnetic reluctance is reduced to lower than a predetermined value, and therefore a satisfactory magnetic circuit is formed. That is, in the embodiment, the space between the magnetic path forming protrusions 166a, ... and 168a. . . forming the core on the rotor side and the protruded poles 163a, 163b and 163c of the iron core 63 forming the core on the stator side is filled with the magnetic fluid 169, and therefore, when the former and the latter are confronted with each other, the magnetic reluctance is reduced to lower than the predetermined value, and with the air gap maintained larger than a predetermined value, the T/N characteristic is improved.

More specifically, in the embodiment, the relative magnetic permeability of the magnetic fluid 169 is of the order of 2 to 3, and the effect is the same as that which is obtained when the air gap is reduced by a factor of 2 to 3. It may be considered that a magnetic fluid higher in relative magnetic permeability is developed in the future. If the relative magnetic permeability is 10, then the effect is the same as that which is provided when the air gap is reduced by a factor of 10. The relative magnetic permeability of the above-described magnetic fluid is much smaller than that of (several thousands) of magnetic steel strip, and therefore the magnetic fluid filled in the space will never short-circuit the magnetic circuits.

Fourteenth Embodiment

A fourteenth embodiment of the invention will be described with reference to FIG. 20, in which parts corresponding functionally to those which have been described with reference to FIGS. 1 and 2 (showing the first embodiment) are therefore designated by the same reference numerals with the second digit "2" replaced by "17".

In the embodiment, a rotary shaft 171 is rotatably supported by bearings (not shown), and a rotor's core (armature's core), namely, an iron core 172 is fixedly mounted on the rotary shaft 171 so that the former 172 is rotated together with the latter 171. A field magnet 174 forming the stator is provided outside the iron core 172. Two yoke plates 175 and 176 forming a stator's core are fixedly mounted on both end faces of the field magnet 174 in the direction of axis.

The yoke plates 175 and 176 forming the stator's core include magnetic path forming protrusions 175a, ... and magnetic path forming protrusions 176a, ... , respectively. Each of those magnetic path forming protrusions 175a, ... and 176a, ... has a confronting portion L-shaped in section that confronts with the outer end face of the outer periphery of each of the protruded poles 172a of the iron core 172 forming the rotor's core, and with both end faces thereof in the direction of axis which are near the outer end surface. That is, the core on the rotor side, and the core on the stator side confront through with each other from two sides.

More specifically, the confronting portions of the magnetic path forming protrusions 175a, ... and 176a, ... of the yoke plates 175 and 176 are so arranged as to come near the protruded poles 172a, 172b and 172c of the iron core 172. When the magnetic path forming protrusions 175a, ... and 176a, ... of the yoke plates 175 and 176 are confronted with the protruded poles 172a, 172b and 172c of the iron core 172, the magnetic flux of the field magnet 174 is collectively extended to the iron core 172. The thickness of each of the magnetic path forming protrusions 175a, ... and 176a, ... , and the confronting length over the iron core 172 are substantially equal to the thickness of the iron core 172.

Figure 20:
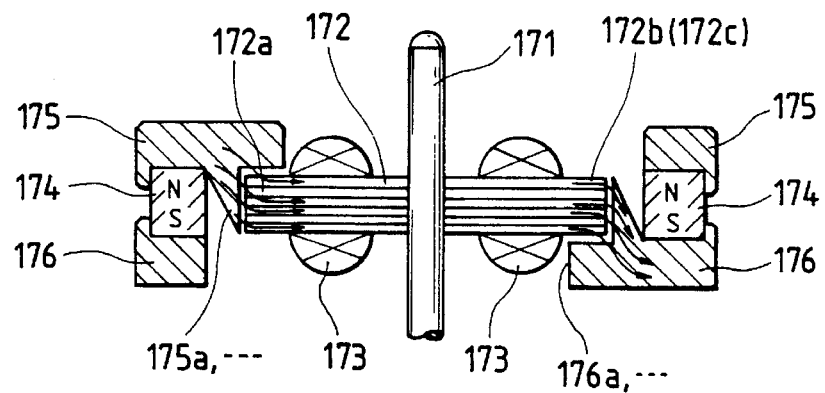
FIG. 20 is an explanatory sectional view showing an electric rotary machine, which constitutes a fourteenth embodiment of the invention.

When, in the motor, the iron core side, namely, the armature side and the field magnet side are positioned as shown in FIG. 20, one magnetic path forming protrusion 175a (N pole) of the yoke plate 175 is set near one protruded pole 172a of the iron core 172, and a pair of magnetic path forming protrusions 176b and 176c (S poles) of the yoke plate 176 are set near the other protruded poles 172b and 272c, and therefore the total magnetic flux of the field magnet 174 are collectively extended through the magnetic path forming protrusions 176a, 176b and 176c to the iron core 172 as indicated by the arrows.

In the embodiment, the core on the rotor side is confronted through with the core on the stator side from two sides. Hence, in the air gap, the magnetic reluctance is decreased, and a satisfactory magnetic circuit is formed. In other words, in the embodiment, the magnetic path forming protrusions 175a, ... and 176a, ... forming the core on the rotor side are confronted with the protruded poles 172a, 172b and 172c of the iron core forming the core on the stator side from two sides, and therefore, when the former and the latter are confronted with each other, the magnetic reluctance is decreased to lower than a predetermined value, and with the air gap maintainer larger than a certain value, the T/N characteristic value is improved.

Fifteenth and Sixteenth Embodiments

Figure 21:
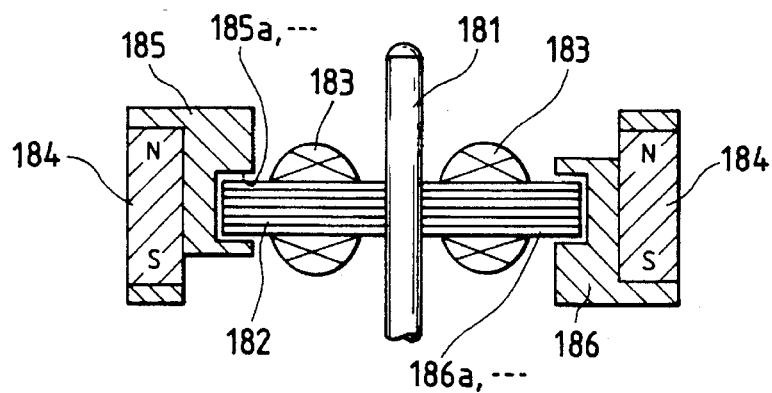
FIG. 21 is an explanatory sectional view showing an electric rotary machine, which constitutes a fifteenth embodiment of the invention.
Figure 22:
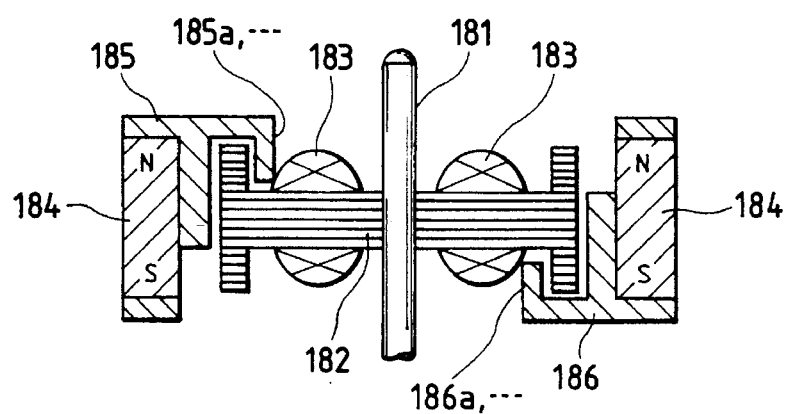
FIG. 22 is an explanatory sectional view showing an electric rotary machine, which constitutes a sixteenth embodiment of the invention.

Fifteenth and sixteenth embodiments of the invention are as shown in FIGS. 21 and 22, respectively. In those embodiments, the inner peripheral portions of magnetic path forming protrusions 185a, ... and 186a, ... forming the core on the stator side, which are confronted with the iron core 182 forming the core on the rotor side, are substantially U-shaped in section, so as to embrace the outer peripheral portions of the protruded poles of the iron core from three sides.

Seventeenth and Eighteenth Embodiments

Figure 23:
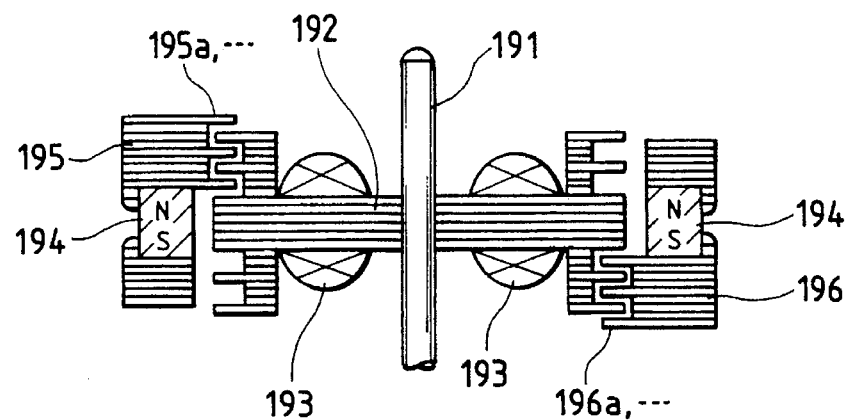
FIG. 23 is an explanatory sectional view showing an electric rotary machine, which constitutes a seventeenth embodiment of the invention.
Figure 24:
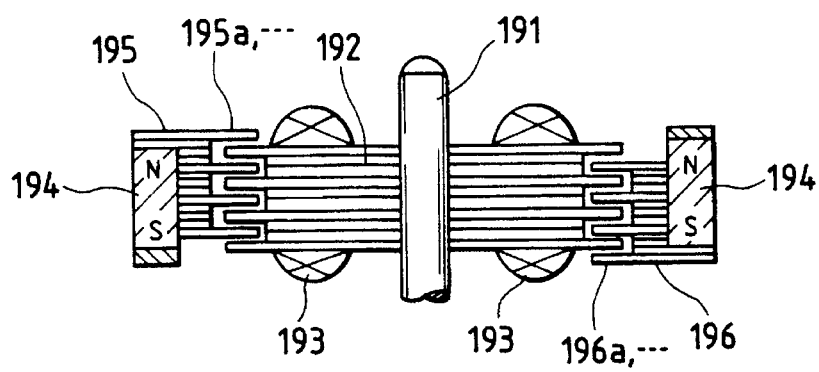
FIG. 24 is an explanatory sectional view showing an electric rotary machine, which constitutes an eighteenth embodiment of the invention.

Seventeenth and eighteenth embodiments of the invention are as shown in FIGS. 23 and 24, respectively.

In those embodiments, two yoke plates 195 and 196 forming the core on the stator side, and an iron core 192 forming the core on the rotor side are formed by stacking magnetic steel strips by laminate pressing. The inner peripheral portions of the magnetic path forming protrusions 195a, ... and 196a, ... of the yoke plates 195 and 196 are each in the form of comb's teeth, and the outer peripheral portions of the protruded poles of the iron core 192 are also in the form of comb's teeth. The inner peripheral portions of the magnetic path forming protrusions 195a, ... and 196a, ... of the yoke plates 195 and 196, and the outer peripheral portions of the protruded poles of the iron core 192, are intertwined, so that the former and the latter are confronted with each other through many surfaces.

In the embodiments, the magnetic path forming protrusions 195a, ... and 196a, ... forming the core on the rotor side are confronted with the protruded poles of the iron core 192 through a plurality of surfaces, and therefore when the former and the latter are confront with each other, in the air gap the magnetic reluctance is reduced to lower than a predetermined value, and similarly as in the above-described embodiments, the T/N characteristic value is improved.

Nineteenth and Twentieth Embodiments

Figure 25:
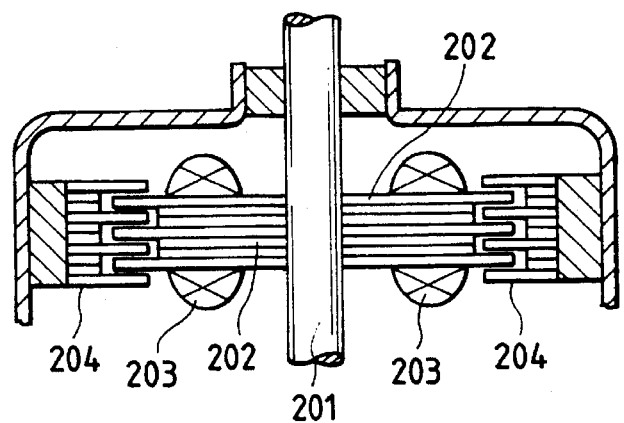
FIG. 25 is an explanatory sectional view showing an electric rotary machine, which constitutes a nineteenth embodiment of the invention.
Figure 26:
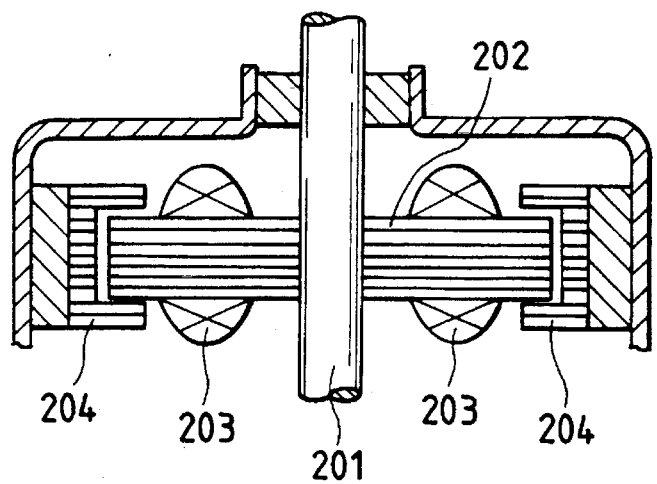
FIG. 26 is an explanatory sectional view showing an electric rotary machine, which constitutes a twentieth embodiment of the invention.

FIGS. 25 and 26 show motors of reluctance type, which constitute nineteenth and twentieth embodiments of the invention, respectively.

In those embodiments, an annular iron core 104 forming the stator core is fixedly mounted on the inner cylindrical surface of a stationary casing. The iron core 104 is formed by stacking magnetic steel strips by laminate pressing.

In the motor shown in FIG. 25, the inner peripheral portion of the iron core 204 is formed like the teeth of a comb, and the outer peripheral portions of the protruded poles of an iron core 202 forming the rotor core are also formed like the teeth of a comb. The inner peripheral portion of the iron core 204, and the outer peripheral portions of the protruded poles of the iron core 202 are intertwined, so that the former and the latter are confronted with each other through a number of surfaces.

In the motor shown in FIG. 26, the inner peripheral portion of the iron core 204 forming the stator core is U-shaped in section, so as to embrace the protruded poles of the iron core 202 forming the rotor core from three sides.

In the embodiments, the core iron 202 on the rotor side, and the core iron 204 on the stator side are confronted with each other through a plurality of surfaces, and therefore when the former and the latter are confront with each other, in the air gap the magnetic reluctance is reduced to lower than a predetermined value, and similarly as in the above-described embodiments, the T/N characteristic value is improved.

While there has been described in connection with the preferred embodiments of this invention, it will be obvious to those skilled in the art that various changes and modifications may be made therein without departing from the invention. For instance, the technical concept of the invention is applicable not only to motors such as rotary motors, linear motors, brush-operated motors and brushless motors but also to other motors in which the armature and the field magnet are combined to provide continuous motion.

What is claimed is:

1. An electric motor comprising:

an armature including an iron core on which a plurality of phase coils are wound;

a field magnet which is so arranged as to be movable with respect to the armature, the field magnet being extended in a direction in which the field magnet is movable with respect to the armature and defining opposing end faces, and the field magnet being magnetized in a direction perpendicular to the direction in which the field magnet is extended and having a magnetic flux; and a yoke plate mounted on each of the opposing end faces of the field magnet thus magnetized, respectively, in such a manner that each said yoke plate is extended in a direction which corresponds to the direction in which the field magnet is extended, each said yoke plate including a plurality of magnetic path forming protrusions which are arranged at predetermined intervals in the direction in which the yoke plate is extended, wherein the iron core and the magnetic path forming protrusions are so arranged that the iron core and the magnetic path forming protrusions are moved towards and away from each other so that the magnetic flux of the field magnet is collectively extended to the iron core, and a direction of the magnetic flux passing through the iron core is reversed at every interval of the magnetic path forming protrusions as the armature and the field magnet are moved relative to each other.

2. An electric motor as claimed in claim 1, wherein the electric motor is a brushless motor including:

said armature including said iron core on which said plurality of phase coils are wound so as to form a stator; and said field magnet and said yoke plates which are rotatable with respect to the armature so as to form a rotor.

3. An electric motor as claimed in claim 1, wherein the electric motor is a small motor including:

said armature including said iron core on which said plurality of phase coils are wound;

said field magnet which is rotatable with respect to the armature; and a commutator for supplying current to the phase coils of the armature.

4. An electric motor as claimed in claim 1, wherein the electric motor is a stepping motor including:

said armature including said iron core on which said plurality of phase coils are wound; and said field magnet which is rotatable with respect to the armature.

5. An electric motor as claimed in claim 2, wherein the field magnet and the yoke plates which form the rotor forming the stator surround the armature forming the stator.

6. An electric motor as claimed in claim 1, wherein the electric motor is a linear motor including:

said armature including said iron core on which said plurality of phase coils are wound; and said field magnet which moves parallel with respect to the armature.

7. An electric motor as claimed in claim 6, wherein the iron core of the armature includes protruded poles on which plural-phase coils are wound, and the protruded poles corresponding to different phases are so arranged as to form parallel magnetic circuits.

8. An electric motor as claimed in claim 7, wherein the plural-phase coils are three-phase coils.

9. An electric motor as claimed in claim 7, wherein the plural-phase coils are two-phase coils.

10. An electric motor as claimed in claim 1, wherein the electric motor is an electric rotary machine which includes:

said armature including said iron core with protruded poles on which plural-phase coils are wound; and said field magnet arranged around a predetermined rotary shaft in such a manner that the field magnet is rotatable with respect to the armature, wherein the protruded poles corresponding to different phases are so arranged as to form parallel magnetic circuits.

11. An electric motor as claimed in claim 10, wherein the plurality of the phase coils are three-phase coils.

12. An electric motor as claimed in claim 10, wherein the plurality of the phase coils are two-phase coils.

13. An electric motor as claimed in claim 1, wherein the electric motor is an electric rotary machine which includes:

said armature including said iron core with protruded poles on which said plurality of phase coils are wound; and said field magnet arranged around a predetermined rotary shaft in such a manner that the field magnet is rotatable with respect to the armature, wherein the protruded poles corresponding to different phases are so arranged as to form series magnetic circuits.

14. An electric motor as claimed in claim 13, wherein the plurality of the phase coils are three-phase coils.

15. An electric motor as claimed in claim 13, wherein a plurality of the iron cores are provided to form series magnetic circuits.

16. An electric motor as claimed in claim 6, wherein the iron core has protruded poles in correspondence to different phases which are so arranged as to form series magnetic circuits.

17. An electric motor as claimed in claim 16, wherein the plurality of the phase coils are three-phase coils.

18. An electric motor as claimed in claim 16, wherein the electric motor includes a plurality of iron cores, and each of the iron cores forms series magnetic circuits.

19. An electric motor as claimed in claim 1, wherein the iron core and the magnetic path forming protrusions are so arranged that the iron core and the magnetic path forming protrusions are brought into contact with each other at least when confronted with each other.

* * * * *